US009427934B2

(12) United States Patent
Tsuchiya et al.

(10) Patent No.: US 9,427,934 B2
(45) Date of Patent: Aug. 30, 2016

(54) STITCHED CARBON FIBER BASE MATERIAL AND WET PREPREG USING SAME

(71) Applicants: IHI AEROSPACE CO., LTD., Koto-ku (JP); IHI CORPORATION, Koto-ku (JP)

(72) Inventors: Yoshinobu Tsuchiya, Fukui (JP); Hidetoshi Kasakawa, Fukui (JP); Masahiko Murata, Fukui (JP); Yu Shigenari, Tokyo (JP); Hiroyuki Satoh, Tokyo (JP)

(73) Assignees: IHI Corporation, Koto-ku (JP); IHI AEROSPACE CO., LTD., Koto-ku (JP)

( * ) Notice: Subject to any disclaimer, the term of this patent is extended or adjusted under 35 U.S.C. 154(b) by 35 days.

(21) Appl. No.: 14/597,783

(22) Filed: Jan. 15, 2015

(65) Prior Publication Data
US 2015/0125651 A1    May 7, 2015

Related U.S. Application Data

(63) Continuation of application No. PCT/JP2013/004386, filed on Jul. 18, 2013.

(30) Foreign Application Priority Data

Jul. 19, 2012    (JP) ................. 2012-160930

(51) Int. Cl.
B32B 5/12    (2006.01)
B32B 5/06    (2006.01)
(Continued)

(52) U.S. Cl.
CPC ................. *B32B 5/06* (2013.01); *B32B 5/024* (2013.01); *B32B 5/12* (2013.01); *B32B 5/26* (2013.01);
(Continued)

(58) Field of Classification Search
CPC .................................. B32B 5/12; B32B 5/26
See application file for complete search history.

(56) References Cited

U.S. PATENT DOCUMENTS 4,320,160 A    3/1982    Nishimura et al.
4,484,459 A    11/1984    Hutson
(Continued)

FOREIGN PATENT DOCUMENTS

CN    1876916 A    12/2006
CN    101578412 A    11/2009
(Continued)

OTHER PUBLICATIONS

International Search Report mailed Oct. 15, 2013 for PCT/JP2013-004386 filed Jul. 18, 2013 with English Translation.
(Continued)

*Primary Examiner* — Alexander Thomas
(74) *Attorney, Agent, or Firm* — Oblon, McClelland, Maier & Neustadt, L.L.P

(57) ABSTRACT

Each sheet material is formed by arraying carbon fiber lines, each having a predetermined width, in parallel with one another. Meanwhile, an array direction of the carbon fiber lines of each sheet material is set to form an angle in a range from ±30° to ±60° to a weaving advancing direction of a stitching yarn. Moreover, a stretch ratio of the stitched base material in its lengthwise direction in a case where a load per inch width of the stitched base material is applied in the weaving advancing direction of the stitching yarn is equal to or below 4% when the load is 5 N, and is equal to or above 10% when the load is 25 N.

7 Claims, 5 Drawing Sheets

(51) Int. Cl.
  B32B 7/08    (2006.01)
  B32B 5/02    (2006.01)
  B32B 5/26    (2006.01)
(52) U.S. Cl.
  CPC ............ *B32B 7/08* (2013.01); *B32B 2260/023* (2013.01); *B32B 2260/046* (2013.01); *B32B 2262/106* (2013.01); *B32B 2305/076* (2013.01); *B32B 2307/51* (2013.01); *B32B 2307/54* (2013.01); *B32B 2605/18* (2013.01); *Y10T 428/24033* (2015.01)

(56) References Cited

U.S. PATENT DOCUMENTS

| | | |
|---|---|---|
| 6,319,348 B1 | 11/2001 | Olry et al. |
| 2007/0202295 A1 | 8/2007 | Kamiya |
| 2008/0166520 A1 | 7/2008 | Zafiroglu et al. |
| 2010/0129597 A1 | 5/2010 | Hansen et al. |
| 2012/0318182 A1 | 12/2012 | Wockatz |

FOREIGN PATENT DOCUMENTS

| | | |
|---|---|---|
| CN | 102454034 A | 5/2012 |
| CN | 102459731 A | 5/2012 |
| JP | 63-159576 A | 7/1988 |
| JP | 2004-167761 A | 6/2004 |
| JP | 2005-014600 A | 1/2005 |
| JP | 2007-160587 A | 6/2007 |
| JP | 2007-162151 A | 6/2007 |
| JP | 2008-106391 A | 5/2008 |
| JP | 2008-179808 A | 8/2008 |
| JP | 2009-249784 A | 10/2009 |
| JP | 2010-196176 A | 9/2010 |
| JP | 2010-196177 A | 9/2010 |
| SU | 653273 A1 | 3/1979 |
| SU | 1699802 A1 | 12/1991 |
| WO | WO 2011/113751 A1 | 9/2011 |

OTHER PUBLICATIONS

Combined Office Action and Search Report issued Jan. 14, 2016 in Chinese Patent Application No. 201380037729.X (with English translation of Categories of Cited Documents).

Extended European Search Report issued Apr. 6, 2016 in Patent Application No. 13820549.7.

Office Action mailed May 17, 2016 in Russian Patent Application No. 2015105369/05(008605).

FIG. 3A
FIG. 3B
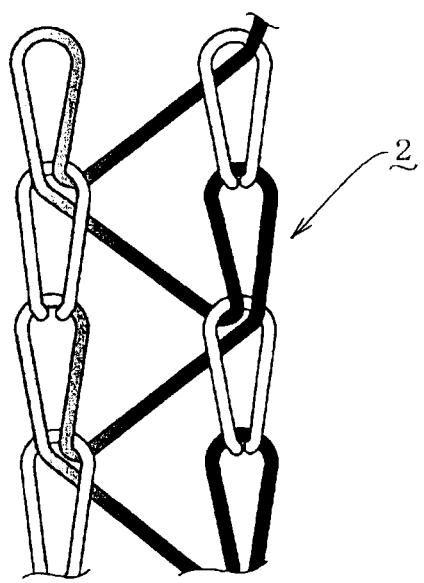
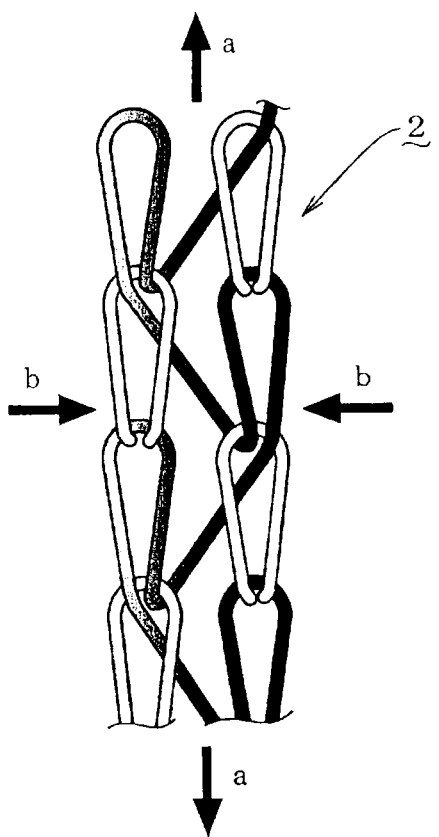

STITCHED CARBON FIBER BASE MATERIAL AND WET PREPREG USING SAME

CROSS REFERENCE TO RELATED APPLICATIONS

This application is a continuation application of International Application No. PCT/JP2013/004386, filed on Jul. 18, 2013, which claims priority to Japanese Patent Application No. 2012-160930, filed on Jul. 19, 2012, the entire contents of which are incorporated by references herein.

BACKGROUND OF THE INVENTION

1. Field of the Invention

The present invention relates to an improvement in a CFRP-forming base material, or more specifically, to: a stitched carbon fiber base material which exhibits excellent form stability and shapability, ensures excellent handleability in processing a wet prepreg in CFRP manufacturing steps, and facilitates production of a three-dimensional shape; and a wet prepreg using the same.

2. Description of the Related Art

Carbon-fiber-reinforced plastics (CFRP) adopting carbon fibers as reinforcing fibers have light-weight, high-strength, and high-elastic-modulus characteristics, and are therefore used in a wide range of fields including sporting and leisure goods, and aerospace as well as other general industries. In particular, the CFRP are frequently used in aircraft where the weight-saving effect is prominent. Nowadays, the CFRP are also being employed in primary structural materials for the aircraft.

As proposed in Japanese Patent Application Publication No. 2005-14600 (PTL 1), for example, there is disclosed a conventional method of molding a CFRP for aircraft which includes: impregnating a sheet material in which carbon fibers are arrayed in one direction, or a fabric material in which carbon fibers are arrayed in two directions, with a matrix resin to produce a prepreg base material; and layering sheets of the obtained prepreg base material on a molding die, followed by heating and curing in an autoclave.

In the unidirectional prepreg base materials or the fabric prepreg base materials described above, the carbon fibers are arrayed straight, and the base materials can be surely impregnated with the resin. Accordingly, such prepreg materials can fully exert the high strength and the high elastic modulus attributed to the carbon fibers.

However, the unidirectional prepreg base materials and the bidirectional fabric prepreg base materials as described above require operations to cut the base material into appropriate sizes and then to layer them while changing orientations of the cutout pieces, which cause problems of increases in operating burdens and costs.

Further, Japanese Patent Application Publication No. 63-159576 (PTL 2) proposes a method of manufacturing a biased base material with carbon fibers arrayed in directions of ±45°, in which the biased base material is obtained by helically cutting a tubular woven fabric that is woven tubularly.

However, the biased base material manufactured by this method is prone to be elongated in a lengthwise direction. Accordingly, the base material causes a problem when supplied to prepreg processing that the base material is elongated in the lengthwise direction and the array of the carbon fibers therein is considerably disordered.

Furthermore, U.S. Pat. No. 4,484,459 (PTL 3) discloses a method of manufacturing a multiaxial stitched base material. This method is expected to achieve labor saving in layering work, and is actively considered for its application to the CFRP.

Here, using this multiaxial stitched technology, a stitched base material including carbon fibers arrayed in directions of ±45° can be obtained by: layering a sheet including carbon fibers arrayed in parallel in a direction of +45° and a sheet including carbon fibers arrayed in parallel in a direction of −45°; and uniting the sheets together with stitching yarns.

However, in the method of PTL 3 to array the carbon fiber lines, each sheet is formed by feeding carbon fibers shuttle-wise between two chains provided behind a stitching m/c (machine). As a consequence, each of the carbon fiber lines is freely movable between the two chains. This leads to a problem that gaps are likely to be formed between the carbon fiber lines.

Accordingly, the stitched base material with the ±45° arrays needs to be formed with a relatively high fiber areal weight. Such a base material has a problem when supplied to the prepreg processing that the inside of the base material cannot be impregnated with the resin due to high viscosity of the resin.

Meanwhile, most of CFRP-molded products such as aircraft components have curved shapes. On the other hand, a prepreg made of the above-described stitched base material with the ±45° arrays is not stretched at all in the lengthwise direction by the presence of the stitching yarns. As a consequence, the prepreg does not possess shapability, so that the prepreg cannot fit properly into a curved surface of a molded product, or may get wrinkled if forced to fit into the curved surface.

The inventors of the present invention have investigated a cause of poor shapability of the base material in the prepreg of this conventional type which makes the prepreg incapable of fitting into an intricately curved surface, and have found out the fact that while the base material is stretchable in its width direction, an extremely low stretch ratio of the stitching yarns in its weaving advancing direction blocks a deformation of the base material.

On the other hand, the inventors have also found out that a cause for the disorder of the carbon fiber lines is that the stitching yarns, if having an increased stretch ratio, are elongated in wet prepreg processing of the carbon fiber lines.

SUMMARY OF THE INVENTION

The present invention has been made in view of the aforementioned problems of the conventional CFRP-forming base materials. An object of the present invention is to provide a stitched carbon fiber base material which exhibits excellent form stability and shapability, ensures excellent handleability in processing a wet prepreg in CFRP manufacturing steps, and facilitates production of a three-dimensional shape, and to provide a wet prepreg using the same.

A solution to the problems adopted by the inventors of the present invention will be described below with reference to the accompanying drawings.

Specifically, the present invention has accomplished a stitched carbon fiber base material by adopting the following technical means in which multiple sheet materials 1, 1, . . . are layered and then stitched and united together into the stitched base material with stitching yarns 2 woven while passing through the sheet materials 1, 1, . . . . Here, each sheet material 1 is formed by arraying carbon fiber lines 11, 11, . . . , each having a predetermined width, in parallel with one another. Meanwhile, an array direction of the carbon fiber lines 11 of each sheet material 1 forms an angle in a range from ±30° to ±60° to a weaving advancing direction of the stitching yarns 2. Moreover, a stretch ratio of the stitched base material in its lengthwise direction in a case where a load per inch width of the stitched base material is applied in the weaving advancing direction of the stitching yarns is equal to or below 4% when the load is 5 N, and is equal to or above 10% when the load is 25 N.

Meanwhile, to solve the problems, in addition to the above-described means as appropriate, the present invention may also adopt the following technical means in which the stitching yarns 2 are stitched on the sheet materials 1 by composite weaves including chain stitch weaves and 1/1 tricot weaves.

Furthermore, to solve the problems, in addition to the above-described means as appropriate, the present invention may also adopt the following technical means in which auxiliary yarns 3 are inserted in the same direction as the weaving advancing direction of the stitching yarns 2.

Furthermore, to solve the problems, in addition to the above-described means as appropriate, the present invention may also adopt the following technical means in which the stitching yarns 2 or the auxiliary yarns 3 are made severable when a load in a range from 5 to 25 N per inch width of the stitched base member is applied in the weaving advancing direction of the stitching yarns 2.

Furthermore, to solve the problems, in addition to the above-described means as appropriate, the present invention may also adopt the following technical means in which fineness of carbon fiber lines 11 of each sheet material 1 is set in a range from 400 to 1200 tex, and a fiber areal weight of each sheet material 1 is set in a range from 150 to 400 g/m².

Furthermore, to solve the problems, in addition to the above-described means as appropriate, the present invention may also adopt the following technical means in which the stitching yarns 2 are stitched at a weaving ratio (R) in a range from 3.5 to 4.5. Here, the weaving radio (R) is defined as:

Weaving ratio(R)=Length of stitching yarn(L2)/ Length of base material(L1), where L1: a length of the base material, and L2: a length of each stitching yarn required for stitching.

In addition, the present invention has accomplished a wet prepreg by adopting the following technical means in which each sheet material 1 is formed by arraying carbon fiber lines 11, 11, . . . , each having a predetermined width, in parallel with one another while an array direction of the carbon fiber lines 11 of each sheet material 1 forms an angle in a range from ±30° to ±60° to a weaving advancing direction of the stitching yarns 2. Here, a stretch ratio of the stitched base material in its lengthwise direction in a case where a load per inch width of the stitched base material is applied in the weaving advancing direction of the stitching yarns 2 is equal to or below 4% when the load is 5 N and is equal to or above 10% when the load is 25N. Moreover, the wet prepreg is formed by impregnating the stitched carbon fiber base material, in which the plurality of sheet materials 1, 1, . . . are layered and then stitched and united together with the stitching yarns 2 woven while passing through the sheet materials 1, 1, . . . , with a thermosetting resin in a range from 30% to 50% by weight.

The present invention provides the stitched base material, in which the multiple sheet materials are layered and then stitched and united together with the stitching yarns woven while passing through the sheet materials. Here, each sheet material is formed by arraying the carbon fiber lines with the predetermined width in parallel with one another. Moreover, the array direction of the carbon fiber lines of each sheet material forms the angle in the range from ±30° to ±60° to the weaving advancing direction of the stitching yarns. Furthermore, the stretch ratio of the stitched base material in its lengthwise direction in the case where a load per inch width of the stitched base material is applied in the weaving advancing direction of the stitching yarns is equal to or below 4% when the load is 5 N, and is equal to or above 10% when the load is 25 N. Thus, the stitched base material exhibits excellent form stability and shapability, ensures excellent handleability in processing a wet prepreg in CFRP manufacturing steps, and facilitates production of a three-dimensional shape.

Therefore, according to the stitched carbon fiber base material of the present invention, the base material is stitched with the chain stitches in a lengthwise direction using the stitching yarns. Thus, the stitched base material is not elongated by its own weight inside a drying furnace at the time of a wet prepreg. In addition, the orientations of the carbon fiber lines arrayed at the angles from ±30° to ±60° are kept from disorder. Hence, the stitched carbon fiber base material can achieve quasi-isotropy.

Moreover, in the wet prepreg processing, the prepreg is processed without causing the disorder of the carbon fiber lines. In addition, the obtained prepreg base material also exerts shapability and can be layered to form a molded product having a curved surface without requiring cut-and-paste work. Hence, the present invention can achieve labor saving in the layering work, and it is possible to say that its industrial applicability is extremely high.

BRIEF DESCRIPTION OF THE DRAWINGS

FIGS. 3A and 3B are schematic diagrams each showing stitches of chain stitches in the stitched carbon fiber base material of the embodiment of the present invention.

DESCRIPTION OF THE PREFERRED EMBODIMENTS

An embodiment of the present invention will be described below in further detail on the basis of the concretely illustrated drawings.

Figure 1:
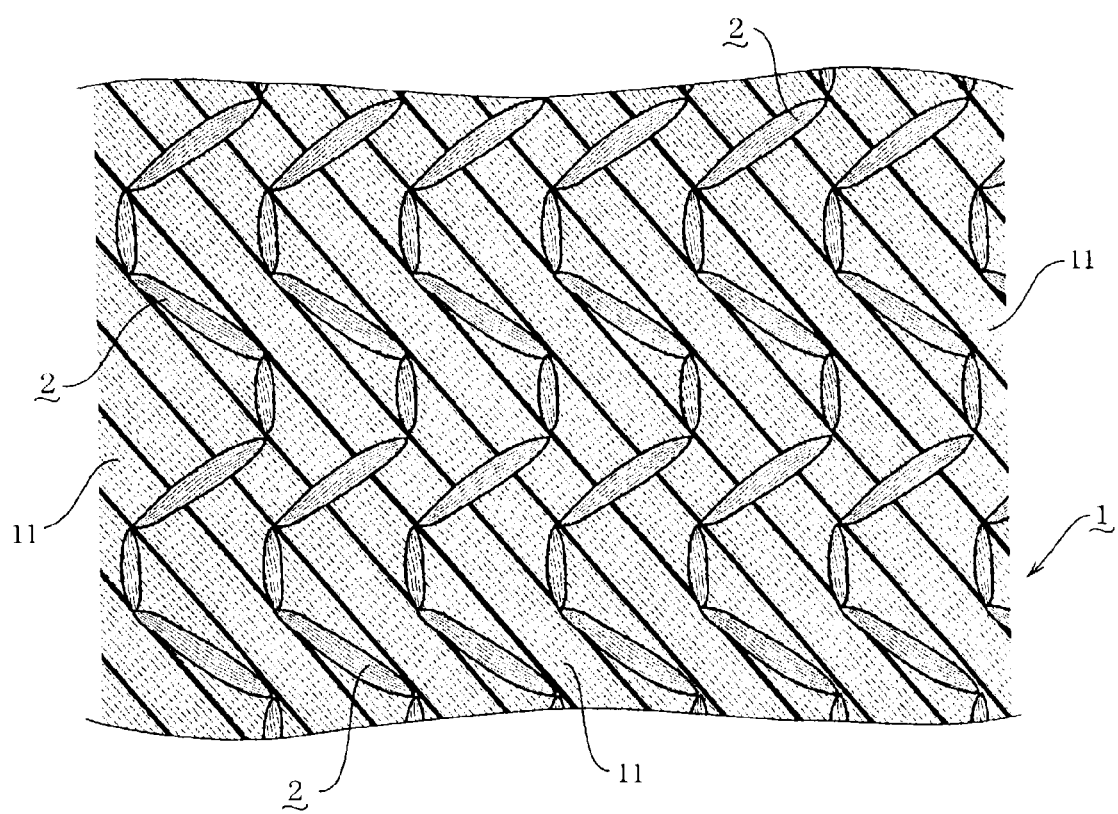
FIG. 1 is a front view showing a stitched carbon fiber base material of an embodiment of the present invention.

The embodiment of the present invention will be described on the basis of FIG. 1 to FIG. 6. In FIG. 1, reference sign 1 denotes a sheet material which is formed by arraying carbon fiber lines 11, 11, . . . , each having a predetermined width, in parallel with one another.

Meanwhile, reference sign 2 denotes a stitching yarn. A synthetic resin yarn such as polyester is employed in the stitching yarn 2.

Here, this embodiment provides a stitched base material in which multiple sheet materials 1, 1, . . . , are layered and then stitched and united together with stitching yarns 2 woven while passing through the sheet materials 1. To form the stitched base material, each sheet material 1 is first formed by arraying the carbon fiber lines 11, 11, . . . , each having a predetermined width (about 2 mm in this embodiment), in parallel with one another.

The carbon fiber lines 11 of this embodiment may adopt polyacrylonitrile-based or pitch-based carbon fibers. In order to obtain a large reinforcing effect with a small amount of fibers, it is desirable to employ such carbon fibers having a high strength and a high elastic modulus, or more specifically, those having a tensile strength equal to or above 3 GPa or preferably equal to or above 4 GPa, and a tensile elastic modulus in a range from 200 to 700 GPa.

Meanwhile, in this embodiment, fineness of the carbon fiber lines 11 of each sheet material 1 is set in a range from 400 to 1200 tex so as to set a fiber areal weight of each sheet material 1 in a range from 150 to 400 g/m$^2$.

The fineness of the carbon fiber lines 11 and the weight of the base material are to be determined on the basis of targeted performances of a molded product or requisite characteristics including costs and the like. Nonetheless, it is also necessary to consider that high-quality base materials have to be stably supplied in the case of aircraft components and the like where reliability is required.

Meanwhile, the production of the carbon fiber lines 11 requires almost the same firing rate irrespective of the fineness thereof. Accordingly, a manufacturing cost per unit weight becomes lower as the fineness is greater. As a consequence, it is advantageous to use the carbon fiber lines with the greater fineness.

However, an attempt to obtain a sheet material 1 with a low fiber areal weight by a parallel array of thick carbon fiber lines 11 with the fineness equal to or above 1200 tex would lead to an increase in distance between each pair of the carbon fiber lines 11, 11. Such an increase in distance may cause gaps between the lines or irregularities on a surface of the base material on the line basis. This is why the fineness of the carbon fiber lines 11 is preferably equal to or below 1200 tex.

On the other hand, if the fineness of the carbon fiber lines 11 is too small, the carbon fiber lines 11 become costly per se and more lines have to be prepared and arrayed densely in order to form the sheet material 1. This is why the fineness of the carbon fiber lines 11 is preferably equal to or above 400 tex.

Next, in this embodiment, an array direction of the carbon fiber lines 11 of each sheet material 1 forms an angle in a range from ±30° to ±60° to a weaving advancing direction of the stitching yarns 2. This base material can be obtained by a generally known multiaxial stitching m/c (machine).

Note that the array angles of the carbon fiber lines 11 are to be determined on the basis of the strength and the elastic modulus required in the molded product, and usually the base material in which the carbon fiber lines 11 are arrayed in the directions of ±45° is most stable and is therefore preferred in the case where quasi-isotropy is required. However, in this embodiment, the similar operation and effects can also be achieved by setting the array angles in the range from ±30° to +60°.

Figure 2:
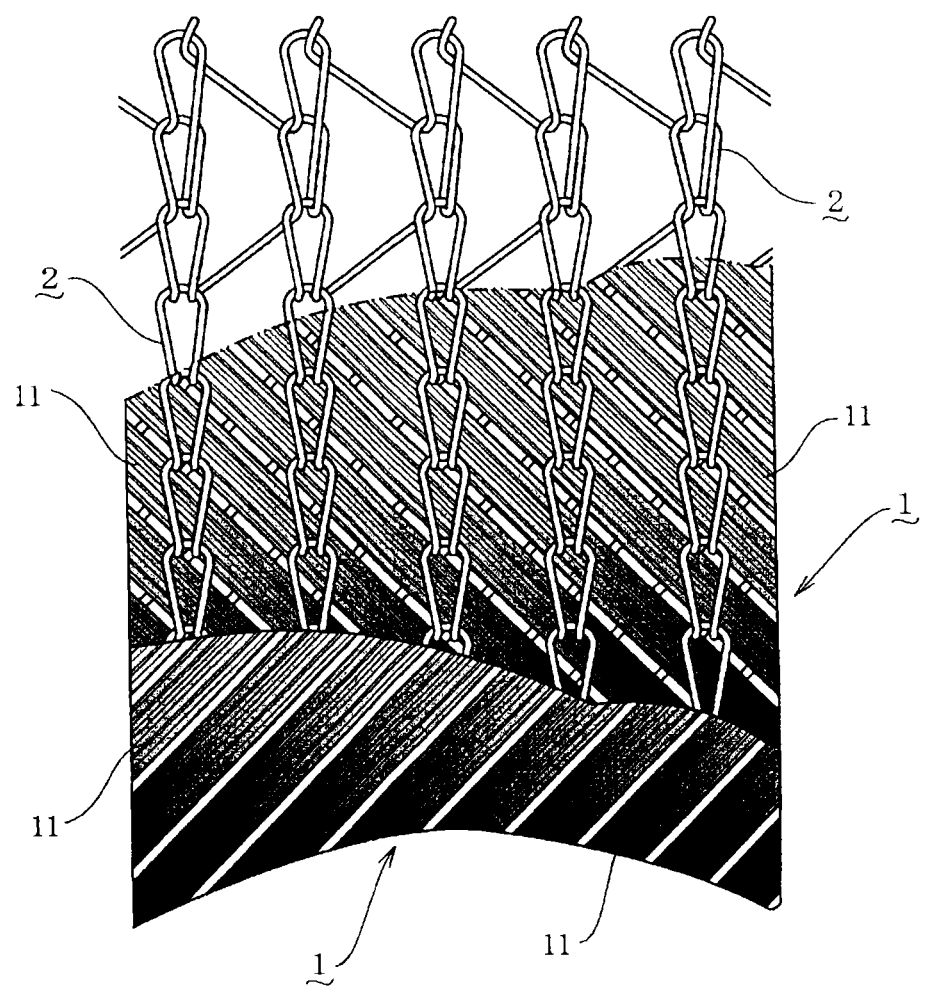
FIG. 2 is a schematic diagram showing a structure of the stitched carbon fiber base material of the embodiment of the present invention.

FIG. 2 illustrates the stitched base material of this embodiment in which the carbon fiber lines 11 are arrayed in the directions of ±45°. FIG. 2 is exploded and an upper part therein illustrates only the stitching yarns in order to facilitate understanding of weaves of the stitching yarns 2.

Here, the stitching yarns 2 unite the sheet material 1 formed from the carbon fiber lines 11 arrayed at the angle of −45°, and the sheet material 1 formed from the carbon fiber lines arrayed at the angle of +45°, together by composite weaves including chain stitch weaves and 1/1 tricot stitch weaves, in which each stitching yarn 2 forms two chain stitch weaves continuously by stitching, then moves to an adjacent knitting needle, then forms two chain stitches continuously by stitching, and then moves back to the original knitting needle.

Here, in the chain stitches, each stitch is formed in a state strongly tightened by stitch tension applied at the time of stitching. Accordingly, the stitching yarn 2 is hardly stretched when pulled in a longitudinal direction (a stretched direction of the stitch (the weaving advancing direction)) since there is no room for the stretch. On the other hand, in the case of the 1/1 tricot stitches shown in FIG. 3(*a*), each stitching yarn shuttles between two rows of stitches in a zigzag manner. Accordingly, when the stitching yarn is pulled in the longitudinal direction (direction a), the stitching yarn moves toward the stitches while drawing the rows of stitches along a lateral direction (direction b) as shown FIG. 3(*b*), whereby the stitches are apt to be stretched lengthwise. In other words, the 1/1 tricot stitches can be deemed as weaves which are apt to be stretched easily by applying a small external force in the longitudinal direction.

As a consequence, the combination of the chain stitch weaves and the 1/1 tricot stitch weaves having the above-described stretch characteristics makes it easier to obtain stretch ratios intended by the present invention.

Moreover, a stretch ratio in the lengthwise direction of the stitched base material by application of a load of 5 N per inch width relative to the weaving advancing direction of the stitching yarns 2 is set equal to or below 4% while a stretch ratio in the lengthwise direction by application of a load of 25 N is set equal to or above 10%. Note that the "stretch ratio" is a value measured in accordance with a measurement method described in JIS L 1018 (Methods of measuring elongation percentage of knitted fabrics: the grab method). Although FIG. 2 illustrates the example of continuously providing two chain stitches, the combination of the chain stitches and the 1/1 tricot stitches may be appropriately changed as long as such a change satisfies the above-mentioned ranges of numerical values.

Here, the tension to be applied to the stitched base material may reach as large as about 5 N per inch width at the time of wet prepreg processing to be described later. Therefore, it is necessary to determine an appropriate range of the stretch ratio. If the stretch ratio in the lengthwise direction of the stitched base material by application of the load of 5 N per inch width relative to the weaving advancing direction of the stitching yarns 2 exceeds 4%, the base material may be elongated significantly in its lengthwise direction inside a drying furnace for the wet prepreg processing, thereby considerably disordering orientations of the carbon fiber lines. Accordingly, the stretch ratio in the lengthwise direction of the stitched base material by application of the load of 5 N per inch width is preferably equal to or below 4%. Here, the stretch ratio in the lengthwise direction by application of the load of 5 N is more preferably equal to or below 3%.

On the other hand, if the stretch ratio in the lengthwise direction by application of the load of 25 N per inch width falls below 10%, a prepreg base material is hardly deformable at the time of shaping when the prepreg base material is stretched with hands in an attempt to shape the prepreg base material appropriately. As a consequence, the prepreg base material can hardly fit into a curved surface depending on its form and may get wrinkled. Accordingly, the stretch ratio in the lengthwise direction of the stitched base material by application of the load of 25 N per inch width is preferably equal to or above 10%. Here, the stretch ratio in the lengthwise direction by application of the load of 25 N more preferably falls in a range of 10% to 20%. This is due to a reason that, if the stretch ratio in the lengthwise direction by application of the load of 25 N exceeds 20%, there may be a case where the prepreg base material may suddenly be stretched too much when a force is applied so as to stretch the prepreg base material and to smooth out the wrinkles at the time of shaping. As a consequence, the prepreg base material may be elongated more than necessary and such elongated portions are prone to cause other wrinkles.

Due to the reasons mentioned above, it is preferable to set the stretch ratio in the lengthwise direction of the stitched base material by application of the load of 5 N per inch width equal to or below 4%, and to set the stretch ratio in the lengthwise direction by application of the load of 25 N equal to or above 10%. More preferably, the stretch ratio at the time of 5 N is equal to or below 3%. Meanwhile, the stretch ratio at the time of 25 N is preferably in the range of 10% to 20%.

Next, in this embodiment, auxiliary yarns 3 can be inserted in the same direction as the weaving advancing direction of the stitching yarns 2. Thus, it is possible to reinforce the stitched base material and to achieve its form stability (see FIG. 4).

Moreover, any of the stitching yarns 2 and the auxiliary yarns 3 may be made severable when the load in a range of 5 N to 25 N per inch width of the stitched base material is applied in the weaving advancing direction of the stitching yarns 2. In this way, it is possible to prevent disorder of the orientations of the carbon fiber lines 11 attributed to a deformation of the stitched base material in the wet prepreg processing, and thereby to improve shapability when the processed prepreg is used.

Furthermore, in this embodiment, the stitched carbon fiber base material can be stitched at a weaving ratio R of the stitching yarns 2 in a range from 3.5 to 4.5. Here, the weaving ratio R is defined as follows:

Weaving ratio(*R*)=Length of stitching yarn(*L*2)/ Length of base material(*L*1), where L1: a length of the base material, and L2: a length of each stitching yarn required for stitching.

Here, in order for allowing the stitched base material to be stretched in the weaving advancing direction of the stitched yarns 2, the stitched base material needs to adopt a knitted fabric structure in which a length of each fiber shifted to the adjacent row of stitches can move easily in the lengthwise direction as in the case of the 1/1 tricot stitches.

Although it depends on the fiber areal weight of the base material, in the case of the chain stitches, the weaving ratio (R) is around 3.5 when the base material is made of the sheet materials 1 defined in this embodiment, each of which has the fiber areal weight in the range from 150 to 400 g/m². In this case, there is very little length of the fiber that allows the movement in the lengthwise direction.

Meanwhile, the weaving ratio of the 1/1 tricot stitches relates to a pitch in a lateral direction of the row of the stitches, i.e., a distance between the rows of stitches and affects the stretch ratio in the longitudinal direction of the base material at the same time. For example, a larger distance between the rows of stitches is equivalent to a high weaving ratio, which means at the same time that the base material is prone to elongation in the weaving advancing direction of the stitching yarns.

From the facts mentioned above, if the weaving ratio (R) is equal to or below 3.5 in the stitched carbon fiber base material of the present invention, its stretch ratio by application of the load of 25 N in the weaving advancing direction of the stitching yarns becomes equal to or below 10%. As a consequence, the base material is less deformable and cannot fit into a molded product having a curved surface. Accordingly, it is preferable to set the weaving ratio (R) of the stitching yarns equal to or above 3.5.

On the other hand, if the weaving ratio (R) is equal to or above 4.5, the stretch ratio of the base material by application of the load of 5 N exceeds 4%, and there is a risk of elongation of the base material at the time of drying in the wet prepreg processing whereby the orientations of the carbon fibers may be disordered. Accordingly, it is preferable to set the weaving ratio (R) of the stitching yarns equal to or below 4.5.

In the meantime, a relation between a physical property of either the stitching yarns 2 or the auxiliary yarns 3 inserted in the direction of 0° (the same direction as the interleaving advancing direction), which are severed by the application of the load from 5 N to 25 N per inch width of the stitched base material, and a breaking load P at the time when the auxiliary yarns 3 are severed can be expressed by the following numerical formula. The strength, fineness, and array density of the stitching yarns 2 or the auxiliary yarns 3 may appropriately be selected such that the breaking load P falls within the range from 5 to 25 N. It is to be noted, however, that the stitching yarns 2 include three threads in one row arranged in the 0° direction, so the array density thereof is defined as three times larger:

Breaking load *P*(*N*)=Strength of yarns(*N*/tex)×Fineness of yarns(tex)×Array density(threads/inch).

Meanwhile, the stretch ratio of the base material at the time of severance of the stitching yarns 2 or the auxiliary yarns 3 at the above-described condition is preferably set within 10%. Such fiber yarns may include natural yarns such as cotton yarns or hemp yarns. Since synthetic resin fibers have relatively high rupture elongation, the rupture elongation may preferably be reduced by subjecting the synthetic resin fibers to an elongation heat treatment in advance. Note that when the stretch ratio is controlled only by the stitching yarns, such stitching yarns should be limited to include the chain stitches.

By adopting the above-described conditions, it is possible to cause the stitching yarns 2 or the auxiliary yarns 3 to withstand 5 N per inch width within the range of the tensile load to be applied to the base material in the wet prepreg processing to be described later, and thus to perform processing while controlling deformations of the yarns within such a range that does not affect the physical properties thereof.

Thereafter, when the obtained prepreg is caused to fit into an intricate molding die for the CFPR, the prepreg can easily fit into the molding die by stretching a portion of the prepreg to be stretched and thereby severing the stitching yarns 2 or the auxiliary yarns 3 at that portion.

Figure 4:
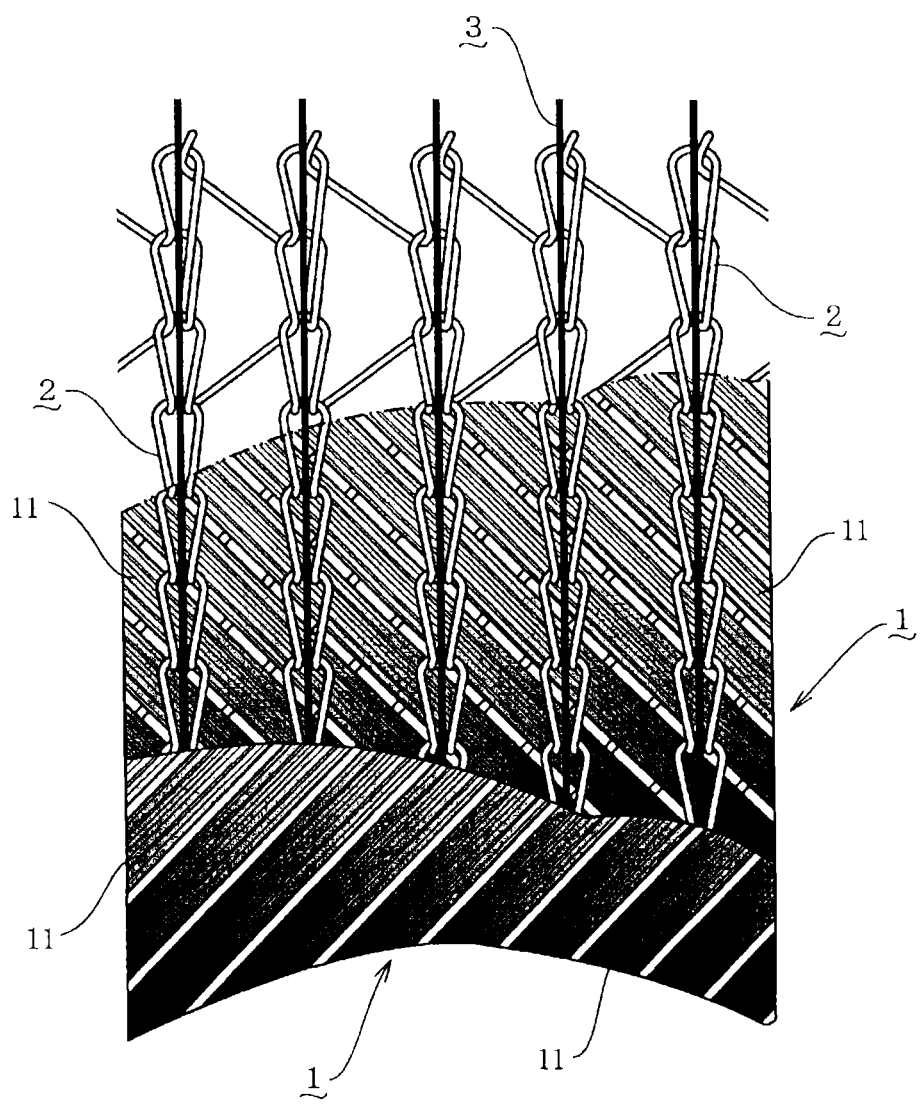
FIG. 4 is a schematic diagram showing a modified example of the structure of the stitched carbon fiber base material of the embodiment of the present invention.

When the auxiliary yarns 3 are provided, the following method is adopted in which the auxiliary yarns 3 are inserted in the 0° direction and at regular intervals relative to the width direction between the two sheets each formed by arraying the carbon fiber lines 11 in parallel (see FIG. 4). In this case, since the elongation in the 0° direction of the stitched base material is controlled, the stitched base material may employ stretchable weaves such as the 1/1 tricot stitch weaves solely for the purpose of uniting the stitched base material together. By doing so, the prepreg can be shaped in the united state.

Although the above-described breaking load P varies depending on the fiber areal weight of the base material and the prepreg processing conditions, the breaking load P is preferably set as low as possible considering a forming process to take place later.

Meanwhile, a place where the highest tension is applied to the stitched base material in the wet prepreg processing to be described later is an uppermost part of an upright drying furnace, where a feeding brake force and frictions of guides and the like are applied in addition to the own weight of the prepreg yet to be dried. As a consequence, the tension applied to the stitched base material reaches 5 N per inch width of the base material at the maximum. Accordingly, the base material needs to have enough strength for withstanding that load.

In the meantime, when the breaking load P is equal to or above 25 N per inch width of the base material, the stitching yarns 2 or the auxiliary yarns 3 are kept from severance in the prepreg processing, but it is necessary to apply an extremely large force to sever the stitching yarns 2 or the auxiliary yarns 3 at the time of molding instead. Accordingly, it is preferable to set the breaking load P in the range from 5 N to 25 N per inch width of the stitched base material.

Furthermore, the fiber areal weight of each sheet material 1 formed by arraying the carbon fiber lines 11 at +45° or −45° is preferably set in a range from 150 to 400 g/m². When the fiber areal weight is equal to or below 150 g/m², the density of the arrayed carbon fiber lines 11 is reduced, whereby gaps are more likely to occur between the carbon fiber lines 11, 11 or the number of sheets to be layered at the time of molding may be increased. Accordingly, the fiber areal weight of each sheet member 1 is preferably equal to or above 150 g/m².

On the other hand, when the fiber areal weight of each sheet material 1 is equal to or above 400 g/m², the number of sheets to be layered at the time of molding is reduced and labor is thus saved. However, since the base material becomes thicker, a solvent inside the base material may be less likely to evaporate in a drying step of the wet prepreg processing. Accordingly, the fiber areal weight of each sheet member 1 is preferably equal to or below 400 g/m².

<Concerning Wet Prepreg Molding>

Next, molding of a wet prepreg in this embodiment will be described below. Here, the stitched carbon fiber base material is produced in accordance with the above-described procedures. Then, the prepreg is formed by impregnating this stitched carbon fiber base material with a thermosetting resin in a range from 30% to 50% by weight. Examples of the thermosetting resin include epoxy resin, phenol resin, vinyl ester resin, unsaturated polyester resin, and the like. Among them, epoxy resin is preferred.

Meanwhile, the wet prepreg processing can be achieved by: dipping the base material having a high fiber areal weight into the resin diluted with a solvent, causing the solvent to evaporate while moving the base material up and down in the vertically long drying furnace, thereby impregnating the inside of the stitched base material with the resin.

Figure 5:
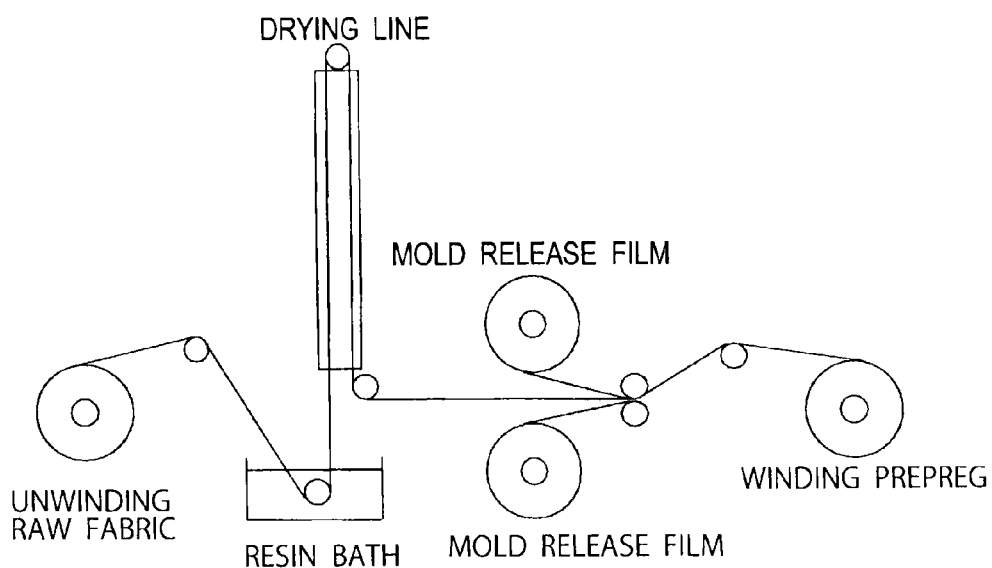
FIG. 5 is a schematic diagram showing manufacturing steps of a wet prepreg using the stitched carbon fiber base material of the embodiment of the present invention.

A wet prepreg processing method will be described on the basis of FIG. 5. First, the rolled stitched carbon fiber base material is drawn out at a velocity in a range from 1.5 m/min to 5 m/min, and is dipped in a resin bath filled with the resin solution diluted with the solvent. Spaces between fibers of the base material are impregnated with the resin, and then the base material is fed to the upright drying furnace having a sufficient length of a drying zone and provided with a rotating roll on its top.

Next, after the passage of the resin bath, the stitched base material attaching the solvent is lifted straight upward to the rotating roll so as to dry a certain amount of the solvent on an ascending side of the drying furnace. Then, the advancing direction of the fabric is reversed by way of the rotating roll, and the rest of the solvent is dried on a descending side of the drying furnace. Hence, the wet prepreg is finished.

Here, an amount of the attached resin is preferably set in a range from 30% to 50% by weight for the purpose of raising a volume content (Vf) of the carbon fibers as high as possible and causing the base material to exert a high strength and a high elastic modulus.

When the amount of the attached resin is equal to or above 50% by weight, the volume content of the carbon fibers is reduced whereby the strength and the elastic module as a CFRP material are reduced. As a consequence, the CFRP cannot exert its weight saving effect. On the other hand, when the amount of the attached resin is equal to or below 30% by weight, the resin is not enough for entirely filling voids inside the stitched carbon fiber base material. Accordingly, the CFRP may include portions where the resin is absent, and may cause destruction.

EXAMPLES

Next, results of experiments on a sample prepared by actually producing the stitched base material of this embodiment will be described.

Example 1

As the stitched carbon fiber base material, each sheet was prepared by using carbon fiber lines having a tensile strength of 5880 MPa, a tensile elastic modulus of 290 GPa, and fineness of 1030 tex (the number of filaments equal to 24000) as reinforcing fibers, and arraying the carbon fiber lines in parallel to one another such that the fiber areal weight of the sheet becomes 258 g/m². Then, the sheets were layered at angles of ±45° relative to the weaving advancing direction of the stitching yarns.

Thereafter, using polyester fibers of 84 dtex, the base material was stitched with composite weaves including the chain stitch weaves and the 1/1 tricot stitch weaves at a wale density of 5 W/inch and a course density of 8.9 C/inch by: stitching two chain stitches continuously; then moving each stitching yarn 2 to an adjacent knitting needle; stitching two chain stitches continuously; and moving the stitching yarn back to the original knitting needle.

The stitched carbon fiber base material thus obtained did not cause any gaps between adjacent carbon fiber lines. In addition, the base material was stitched with the orientations of the carbon fibers at the predetermined orientation angles.

Figure 6:
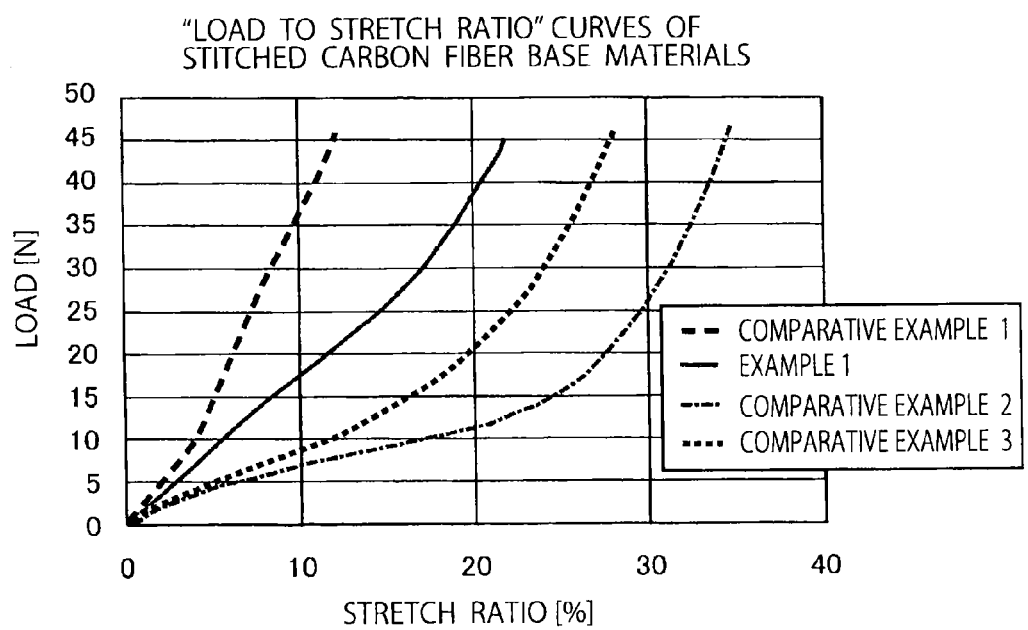
FIG. 6 is a graph showing a physical property of the stitched carbon fiber base material of the embodiment of the present invention.

Moreover, the obtained stitched base material was subjected to an elongation test in accordance with JIS L 1018 (Methods of measuring elongation percentage of knitted fabrics: the grab method). Results are as shown in FIG. 6. Specifically, the stretch ratio at the load of 5 N was 2.6% while the stretch ratio at 25 N was 14.1%.

Meanwhile, the stitched carbon fiber base material thus obtained and rolled was subjected to the wet prepreg processing by: dipping the base material in the resin diluted with a mixed solvent of MEK (methyl ethyl ketone) and ethanol; and moving the base material up and down inside the upright drying furnace to cause the solvent to evaporate such that the amount of the attached resin became equal to 40% by weight.

As a result of the processing, the base material was successfully processed without being elongated or causing disorder of the orientations of the carbon fiber lines. This result reflects the effect of setting the stretch ratio at 5 N equal to or below 4%, which suppressed the elongation of the base material against the tension applied at the time of the processing.

In the meantime, in order to examine shapability of the wet prepreg thus obtained, the wet prepreg was cut into a piece having a 50 cm×50 cm size, and was attached onto a work helmet from above while pulling the wet prepreg in the weaving advancing direction of the stitched yarns and in a perpendicular direction thereto. As a result, the wet prepreg succeeded in fitting into the work helmet almost perfectly. This is due to the large stretch ratio at 25 N. Hence, when the base material is pulled at the time of shaping in order to smooth out wrinkles thereon, the base material can be deformed easily and wrinkles can be smoothed out easily.

Comparative Example 1

Next, a base material was stitched in accordance with the same method as that used in the above-described (Example 1), except that the weaves of each stitching yarn consisted of the chain stitches. Results of an elongation test of this base material are as shown in FIG. 6. Specifically, the stretch ratio at the load of 5 N was 2.1% while the stretch ratio at 25 N was 7.3%.

Meanwhile, the base material was subjected to the wet prepreg processing under the same conditions as Example 1. As a result, the base material was successfully processed without being elongated or causing disorder of the orientations of the carbon fiber lines. This result reflects the effect of setting the stretch ratio at 5 N equal to or below 4%, which suppressed the elongation of the base material against the tension applied at the time of the processing.

In the meantime, shapability of the processed wet prepreg was examined in the same manner as in the case of (Example 1). As a result, wrinkles occurred because the wet prepreg was stretched only in the direction perpendicular to the weaving advancing direction of the stitching yarns. Hence, the wet prepreg could not fit into the shape of the work helmet without causing the wrinkles. This is due to the reason that the stretch ratio at 25 N was 7.3%, so the base material is hardly deformable when pulled in order to smooth out the wrinkles at the time of shaping.

Comparative Example 2

Stitch processing was conducted under the same conditions as those in (Example 1), except that the weaves of each stitching yarn consisted of the 1/1 tricot weaves.

In this (Comparative Example 2), the stretch ratio at the load of 5 N was 6.4% while the stretch ratio at 25 N was 28.4%. Meanwhile, the base material was subjected to the wet prepreg processing under the same conditions as those in (Example 1). As a result, the base material was elongated in its longitudinal direction inside the drying furnace due to its own weight, and shrank in its width direction at the same time. Hence, the carbon fiber lines previously oriented straight in the directions of ±45° were considerably disordered and formed into intricately curved shapes. The base material turned out useless as a consequence. This is because of the large stretch ratio at the load of 5 N, which caused a significant deformation of the base material by the tension at the time of the prepreg processing.

Comparative Example 3

Stitching was conducted under the same conditions as those in Example 1, except that the weaving ratio was set to 4.6. In this (Comparative Example 3), the stretch ratio at the load of 5 N was 5.1% while the stretch ratio at 25 N was 22.3%. Meanwhile, the wet prepreg processing was conducted under the same conditions as those in (Example 1). As a result, the base material was elongated slightly in its longitudinal direction inside the drying furnace due to its own weight, and also shrank slightly in its width direction at the same time. Hence, the carbon fiber lines previously oriented straight in the directions of ±45° were disordered and formed into curved shapes. The degree of the disorder was smaller as compared to (Comparative Example 2).

Although (Comparative Example 3) adopted the same weaves as those of (Example 1), the weaving ratio was set too large. For this reason, the stitches became looser and the stretch ratio at the load of 5 N was increased. Presumably, the orientations of the carbon fiber lines were slightly disordered as a consequence.

In the meantime, shapability of the processed wet prepreg was examined in the same manner as in the case of (Example 1). As a result, the wet prepreg could be shaped almost perfectly as in the case of (Example 1). The behaviors of the base materials of the above-described Example 1, Comparative Example 1, Comparative Example 2, and Comparative Example 3 are shown in Table 1 below.

TABLE 1

|  | Example 1 | Comparative Example 1 | Comparative Example 2 | Comparative Example 3 |
| --- | --- | --- | --- | --- |
| Weaving ratio | 3.65 | 3.51 | 4.39 | 4.61 |
| Stretch at 5N load | 2.6% | 2.1% | 6.4% | 5.1% |
| Stretch at 25N load | 14.1% | 7.3% | 28.4% | 22.3% |
| Elongation and width shrinkage when processed into wet prepreg | good | good | bad | moderate |
| Disorder of carbon fibers when processed into wet prepreg | good | good | bad | moderate |
| Shapability | good | bad | nil | good |

As described above, the one in which the stitching yarns are stitched on the sheet materials by the composite weaves including the chain stitch weaves and the 1/1 tricot weaves showed the most excellent physical properties.

While the present invention is substantially configured as described above, the present invention is not necessarily limited to the illustrated embodiment but various modifications are possible within the scope as defined in the "claims". For example, the number of the layered sheet materials 1 is not limited to two but may be increased as appropriate. Such a configuration is also encompassed by the technical scope of the present invention.

What is claimed is:

1. A stitched carbon fiber base material, wherein
a plurality of sheet materials are layered and then stitched and united together into the stitched base material with a stitching yarn woven while passing through the sheet materials,
each sheet material is formed by arraying carbon fiber lines, each having a predetermined width, in parallel with one another while an array direction of the carbon fiber lines of each sheet material forms an angle in a range from ±30° to ±60° to a weaving advancing direction of the stitching yarn, and
a stretch ratio of the stitched base material in its lengthwise direction in a case where a load per inch width of the stitched base material is applied in the weaving advancing direction of the stitching yarn is equal to or below 4% when the load is 5 N, and is equal to or above 10% when the load is 25 N.

2. The stitched carbon fiber base material according to claim 1, wherein the stitching yarn is stitched on the sheet materials by composite weaves including chain stitch weaves and 1/1 tricot weaves.

3. The stitched carbon fiber base material according to claim 1, wherein an auxiliary yarn is inserted in the same direction as the weaving advancing direction of the stitching yarn.

4. The stitched carbon fiber base material according to claim 3, wherein any of the stitching yarn and the auxiliary yarn is severable when a load in a range from 5 to 25 N per inch width of the stitched base member is applied in the weaving advancing direction of the stitching yarn.

5. The stitched carbon fiber base material according to claim 1, wherein
fineness of the carbon fiber lines 11 of each sheet material is in a range from 400 to 1200 tex, and
a fiber areal weight of each sheet material is in a range from 150 to 400 g/m$^2$.

6. The stitched carbon fiber base material according to claim 1, wherein
the stitching yarn is stitched at a weaving ratio in a range from 3.5 to 4.5, the weaving radio being defined as Weaving ratio=Length of stitching yarn $L2$/Length of base material $L1$, where
L1: a length of the base material, and
L2: a length of the stitching yarn required for stitching.

7. A wet prepreg having shapability comprising:
a stitched carbon fiber base material, wherein
a plurality of sheet materials are layered and then stitched and united together into the stitched base material with a stitching yarn woven while passing through the sheet materials,
each sheet material is formed by arraying carbon fiber lines, each having a predetermined width, in parallel with one another while an array direction of the carbon fiber lines of each sheet material forms an angle in a range from ±30° to ±60° to a weaving advancing direction of the stitching yarn,
a stretch ratio of the stitched base material in its lengthwise direction in a case where a load per inch width of the stitched base material is applied in the weaving advancing direction of the stitching yarn is equal to or below 4% when the load is 5 N and is equal to or above 10% when the load is 25 N, and
the wet prepreg is formed by impregnating the stitched carbon fiber base material, into which the plurality of sheet materials are layered and then stitched and united together with the stitching yarn woven while passing through the sheet materials, with a thermosetting resin in a range from 30% to 50% by weight.

* * * * *